United States Patent [19]
Wicks

[11] Patent Number: 5,891,011
[45] Date of Patent: Apr. 6, 1999

[54] VITRIFICATION OF WASTE

[75] Inventor: George G. Wicks, Aiken, S.C.

[73] Assignee: The United States of America as represented by the United States Department of Energy, Washington, D.C.

[21] Appl. No.: 866,780

[22] Filed: Apr. 1, 1992

[51] Int. Cl.⁶ .................................................. A62D 3/00
[52] U.S. Cl. ............................ 588/252; 588/1; 588/253; 204/157.15; 204/157.43
[58] Field of Search ......................... 204/157.43, 157.15; 588/252, 253, 1

[56] References Cited

U.S. PATENT DOCUMENTS

| | | | |
|---|---|---|---|
| 4,376,598 | 3/1983 | Brouns et al. | 588/253 |
| 4,906,290 | 3/1990 | Worner | 75/10.13 |
| 4,935,114 | 6/1990 | Varma | 204/157.43 |
| 4,940,865 | 7/1990 | Johnson et al. | 219/10.55 A |
| 5,024,740 | 6/1991 | Birken et al. | 204/157.15 |

OTHER PUBLICATIONS

Walsh, Stephen. "Turning Up the Heat on Hazardous Waste." Chemical Engineering Oct. 1990 pp. 47–54.
Hardwick et al. *International Seminar on Chemistry and Process Engineering for High—Level Liquid Waste Solidification.* 1981, pp. 53–67.

Primary Examiner—Kathryn Gorgos
Assistant Examiner—Cybille Delacroix Murheid
Attorney, Agent, or Firm—Harold M. Dixon; William R. Moser; Paul A. Gottlieb

[57] ABSTRACT

A method for encapsulating and immobilizing waste for disposal. Waste, preferably, biologically, chemically and radioactively hazardous, and especially electronic wastes, such as circuit boards, are placed in a crucible and heated by microwaves to a temperature in the range of approximately 300° C. to 800° C. to incinerate organic materials, then heated further to a temperature in the range of approximately 1100° C. to 1400° C. at which temperature glass formers present in the waste will cause it to vitrify. Glass formers, such as borosilicate glass, quartz or fiberglass can be added at the start of the process to increase the silicate concentration sufficiently for vitrification.

20 Claims, No Drawings

VITRIFICATION OF WASTE

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to the processing of waste for disposal. In particular, the present invention relates to the encapsulation and immobilization of waste in glass using microwave energy.

2. Discussion of Background

The proper disposal of all kinds of wastes is an important issue. In particular, the disposal of hazardous wastes: biological, chemical and radioactive, is of particular concern to generators, regulatory officials and the public. These waste materials can present a hazard if they reenter the environment. Furthermore, there is the related issue of reduction of waste volume and minimization of disposal space.

A considerable quantity of such wastes are generated each year. Although progress has been made in reducing the volume of wastes generated and in recycling some components of the wastes, there remains a large volume of material that must be safely disposed of.

A number of techniques have been used in stabilizing and encapsulating hazardous wastes and the literature abounds with descriptions of these. A particularly effective technique, called vitrification, is the encapsulation of wastes in glass. Glass is very stable against chemical attack. Vitrification has been studied for decades in connection with radioactive wastes. Typically, the waste is slurried with glass frit into a glass melter where electrodes have heated the glass until it is molten. The waste is incorporated into the glass matrix in such a way that the final, cooled product will resist leaching of the waste for very long periods of time.

In other applications of vitrification, electrodes are placed directly in contaminated earth, which typically has a significant silicate component, and a voltage applied. The resistance of the ground results in sufficient joule heating to vitrify the waste in situ.

Heat can be applied to wastes in a number of different ways. Although the use of electrodes is well known for incorporating waste into glass, the use of microwave energy is known in treating halogenated hydrocarbons, as described in U.S. Pat. No. 4,935,114 issued to Varma. According to his process, he brings toxic wastes into contact with a bed of non-metallic, absorbing particles, such as activated carbon, then heats the waste to 500°–600° C. to destroy the wastes chemically.

However, there remains a need for methods for encapsulating and immobilizing a variety of wastes, methods that are simple and effective, methods that are flexible and reduce the volume of waste substantially from their pre-encapsulated form.

SUMMARY OF THE INVENTION

According to its major aspects and broadly stated, the present invention is a method for encapsulating and immobilizing wastes, and especially wastes containing biological, radioactive and chemical hazards. Encapsulation and immobilization is accomplished in a simple process that can be accomplished remotely and using equipment that can be easily transported. The method of the present invention results in significant volume reduction and in the formation of highly durable waste glass products. The method comprises the steps of applying microwave energy to the waste to raise its temperature sufficiently to incinerate organic material present in the waste, then continuing to apply microwave energy to the waste to further increase its temperature up to the range of approximately 1100° C. to 1400° C., or more. When the waste is held at this second, higher temperature, it will melt and vitrify, assuming it has sufficient glass formers such as silicates in it. If it does not, glass formers can be added. Once vitrified, the waste is allowed to cool and may subsequently be disposed of.

An important feature of the present invention for wastes containing glass-forming components is that it requires no additive other than heat. For wastes such as fiberglass, syringes and circuit boards, there are sufficient glass formers and the effect of the process is to encapsulate and immobilize the chemical hazards of the waste safely, without additives, and to reduce the volume by half. For medical wastes such as syringes and intravenous items, organics are burned off before remaining hazards are vitrified.

The use of microwaves is another important feature of the present invention. Microwaves allow careful control of temperature, yet enable a rapid temperature increase, and can heat waste to higher temperatures than wastes in joule-heated melters. Susceptors can also be used to aid the heating operation. Susceptors are materials that absorb microwaves quickly and then radiate heat energy to heat adjacent materials that are somewhat slower to respond to the microwaves. Aside from efficiency, an advantage of accurate temperature control is the ability to adjust the rate of the burn off of organics to the off-gas system. A too-rapid burning of organics can overwhelm the off-gas system and allow discharge of particulate. Another advantage of the use of microwaves is that they enable much smaller melters than the conventional joule-heated variety. Furthermore, microwaves can be controlled to produce selective heating and to elevate the temperature of a material to higher levels than conventional heaters. A microwave melter is small enough to be transported to the source of the waste or moved from place to place at a disposal site. Microwave melters can also be made for remote handling of wastes when the wastes are highly radioactive or especially hazardous.

Whether glass formers are added to compensate for a shortage of silicates or the waste has sufficient glass formers to begin with, the resulting product of vitrification by microwave energy has good leaching resistance. Furthermore, chemical compounds can be added to the melt that chemically bind certain contaminants such as lead and arsenic, as is well-known in the chemical arts.

Other features and advantages of the present invention will be apparent to those skilled in the art from a careful reading of the Detailed Description of a Preferred Embodiment presented below.

DETAILED DESCRIPTION OF A PREFERRED EMBODIMENT

The present invention is a method for encapsulating and immobilizing waste in a stable matrix. The method is appropriate and economical for wastes having a chemical, biological or radioactive hazard because of the high level of stability required and the generally higher costs of safe disposal of these wastes. The present method is especially well-suited for wastes containing silicates, such as circuit boards and syringes, but silicates or other glass formers can be easily added to any waste to produce the composition required for vitrification.

Crucial to the method is the use of microwaves because of the higher temperatures that can be reached, the greater control available with microwaves and the faster rate of temperature increase.

The method begins by breaking the waste materials into pieces to assist melting and placing them into a crucible of a ceramic material or other material that can withstand high temperatures, that is, temperatures of approximately 2000° C. Microwaves are then applied to the waste materials to raise their temperature to a range of approximately 300° C. to 800° C.

In this temperature range, organics present will be incinerated to an ash. The temperature may be lower or higher in this range depending on what components are present. The crucible off-gases should be vented through an off-gas system that removes particulate so that the off-gas is clean. The rate of temperature rise is preferably about 100° C. per minute and may be much faster as long as it is controlled. It should not be too fast or the off-gas system may be unable to cope with the amount of airborne particulate and volume of off-gas. The rate will therefore depend on the quantity of organics known to be in the waste and the capabilities of the off-gas system. Better encapsulation and immobilization of the waste will be realized if there is a pause at this first temperature until all the organics are incinerated.

At this first, intermediate temperature, no significant melting of silicates present will take place although some materials will melt or soften. After the organics are burned off, the application of microwave energy can resume.

When the temperature reaches a range of approximately 1100° C. –1400° C., the glass formers will melt and encapsulate the ash, metals and other materials present in the wastes, typically in less than five minutes. If there are insufficient glass formers present, the wastes will not be melted. However, in that case glass formers, such as borosilicate glass, quartz or fiberglass, can be added to the waste and the microwave energy reapplied. Once its temperature is back in the range of approximately 1100° C.–1400° C., the waste with formers added will vitrify. After vitrification, the waste is allowed to cool completely and may then be disposed of.

There are many well-known chemical compounds that attach themselves chemically to certain hazardous materials such as lead and arsenic. These can be added before vitrification so that they have an opportunity to immobilize the hazardous material even more effectively.

Because of the use of the present method on metal-containing wastes such as electronic equipment, susceptors can also be used to facilitate melting, and an industrial type microwave of a type readily available and containing the proper protection against arcing and damage is strongly preferred.

It will be apparent to those skilled in the art that many changes and substitutions can be made to the preferred embodiment herein described without departing from the spirit and scope of the present invention as defined by the appended claims.

What is claimed is:

1. A method for encapsulating wastes, said method comprising the steps of:
    applying microwave energy to said wastes to raise the temperature of said wastes to a first temperature, said first temperature sufficient to incinerate organic material in said wastes;
    incinerating said organic material;
    applying microwave energy to said wastes to raise the temperature of said wastes from said first temperature to a second temperature, said second temperature being higher than said first temperature;
    holding said waste at said second temperature until said waste melts; and
    allowing said melted waste to cool.

2. The method as recited in claim 1, wherein said first temperature is in the range of approximately 300° C. to 800° C.

3. The method as recited in claim 1, wherein said second temperature is in the range of approximately 1100° C. to 1400° C.

4. The method as described in claim 1, wherein said waste further comprises circuit boards and said method further comprises the step of breaking said circuit boards into pieces to facilitate melting.

5. The method as described in claim 1, further comprising the step of adding glass formers to said waste.

6. The method as described in claim 1, wherein said first temperature of said waste is raised at a rate of approximately 100° C. per minute.

7. The method as described in claim 1, wherein said waste is held at said second temperature for less than approximately five minutes.

8. The method as recited in claim 1, further comprising the step of placing said wastes into a susceptor before applying said microwave energy, said susceptor absorbing microwave energy and radiating heat energy to heat metals contained in said wastes.

9. A method for encapsulating wastes, said method comprising the steps of:
    applying microwave energy to said wastes to raise the temperature of said wastes to a first temperature, said first temperature sufficient for incineration of organic material in said wastes;
    holding said wastes at said first temperature until said organic material is incinerated;
    applying microwave energy to said wastes to raise the temperature of said wastes from said first temperature to a second temperature, said second temperature sufficient for melting said wastes and higher than said first temperature;
    holding said waste at said second temperature for not more than approximately five minutes;
    adding glass formers to said waste to melt said waste if said waste has not already melted; and
    allowing said melted waste to cool.

10. The method as recited in claim 9, wherein said first temperature is in the range of approximately 300° C. to 800° C., and wherein said second temperature is in the range of approximately 1100° C. to 1400° C.

11. The method as recited in claim 9, further comprising the step of allowing said waste to cool to a temperature below said first temperature before adding said glass formers.

12. The method as recited in claim 9, where said glass formers are selected from the group consisting of borosilicate glass frit, fiberglass and quartz.

13. The method as recited in claim 8, further comprising the step of breaking up said waste before applying said microwave energy so that melting is facilitated.

14. The method as recited in claim 9, where said first temperature of said waste is increased at a rate of approximately 100° C. per minute.

15. The method as recited in claim 9, further comprising the step of placing said wastes into a susceptor before applying said microwave energy, said susceptor absorbing microwave energy and radiating heat energy to heat metals contained in said wastes.

16. A method for encapsulating wastes, said method comprising the steps of:

placing said wastes into a susceptor;

applying microwave energy to said wastes to raise the temperature of said wastes to a first temperature in the range of approximately 300° C. to 800° C. to incinerate organic material in said wastes, said susceptor absorbing microwave energy and radiating heat energy to heat metals contained in said wastes;

holding said wastes at said first temperature until said organic material is incinerated;

applying microwave energy to said wastes to raise the temperature of said wastes from said first temperature to a second temperature in the range of approximately 1100° C. to 1400° C. for melting said wastes;

holding said waste at said second temperature for not more than approximately five minutes;

adding glass formers to said waste to melt said waste if said waste has not already melted; and allowing said melted waste to cool.

17. The method as recited in claim 16, further comprising the step of allowing said waste to cool to a temperature below said first temperature before adding said glass formers.

18. The method as recited in claim 16, where said glass formers are selected from the group consisting of borosilicate glass frit, fiberglass and quartz.

19. The method as recited in claim 16, further comprising the step of breaking up said waste before applying said microwave energy so that melting is facilitated.

20. The method as recited in claim 16, where said first temperature of said waste is increased at a rate of approximately 100° C. per minute.

* * * * *